(12) United States Patent
Murgia et al.

(10) Patent No.: US 8,849,231 B1
(45) Date of Patent: Sep. 30, 2014

(54) SYSTEM AND METHOD FOR ADAPTIVE POWER CONTROL

(75) Inventors: Carlo Murgia, Sunnyvale, CA (US); Alex Afshar, El Dorado Hills, CA (US); David Klein, Los Altos, CA (US)

(73) Assignee: Audience, Inc., Mountain View, CA (US)

( * ) Notice: Subject to any disclaimer, the term of this patent is extended or adjusted under 35 U.S.C. 154(b) by 705 days.

(21) Appl. No.: 12/228,034

(22) Filed: Aug. 8, 2008

Related U.S. Application Data

(60) Provisional application No. 60/964,097, filed on Aug. 8, 2007.

(51) Int. Cl.
    *H04B 1/10* (2006.01)
(52) U.S. Cl.
    USPC ....... 455/296; 455/574; 455/13.4; 455/127.5; 455/343.2; 455/67.13; 381/58; 381/94.1; 381/94.2; 381/94.7; 379/406.03; 379/406.04; 704/225; 704/227; 375/346
(58) Field of Classification Search
    USPC .......... 455/13.4, 522, 572–574, 127.1–127.5, 455/343.1–343.6, 67.13, 296; 381/92, 71.1, 381/58, 94.1–94.7, 94.2, 94; 370/311; 375/346; 379/406.03, 406.04; 704/225, 704/227
    See application file for complete search history.

(56) References Cited

U.S. PATENT DOCUMENTS

| | | | |
|---|---|---|---|
| 3,976,863 A | 8/1976 | Engel | |
| 3,978,287 A | 8/1976 | Fletcher et al. | |
| 4,137,510 A | 1/1979 | Iwahara | |
| 4,433,604 A | 2/1984 | Ott | |
| 4,516,259 A | 5/1985 | Yato et al. | |
| 4,536,844 A | 8/1985 | Lyon | |
| 4,581,758 A | 4/1986 | Coker et al. | |
| 4,628,529 A * | 12/1986 | Borth et al. | 381/94.3 |
| 4,630,304 A * | 12/1986 | Borth et al. | 381/94.3 |
| 4,649,505 A | 3/1987 | Zinser, Jr. et al. | |
| 4,658,426 A | 4/1987 | Chabries et al. | |
| 4,674,125 A | 6/1987 | Carlson et al. | |
| 4,718,104 A | 1/1988 | Anderson | |
| 4,811,404 A | 3/1989 | Vilmur et al. | |
| 4,812,996 A | 3/1989 | Stubbs | |
| 4,864,620 A | 9/1989 | Bialick | |

(Continued)

FOREIGN PATENT DOCUMENTS

| | | |
|---|---|---|
| JP | 62110349 | 5/1987 |
| JP | 4184400 | 7/1992 |

(Continued)

OTHER PUBLICATIONS

Allen, Jont B. "Short Term Spectral Analysis, Synthesis, and Modification by Discrete Fourier Transform", IEEE Transactions on Acoustics, Speech, and Signal Processing. vol. ASSP-25, No. 3, Jun. 1977. pp. 235-238.

(Continued)

*Primary Examiner* — Junpeng Chen
(74) *Attorney, Agent, or Firm* — Carr & Ferrell LLP

(57) ABSTRACT

Systems and methods for adaptive power control are provided. In exemplary embodiments, a primary signal is received. A noise power level of the primary signal is then estimated. The noise power level may then be compared to at least one power threshold. Subsequently, a large power consuming system is controlled based on the comparison of the noise power level to the power threshold.

15 Claims, 5 Drawing Sheets

(56) References Cited

U.S. PATENT DOCUMENTS

| | | | |
|---|---|---|---|
| 4,920,508 A | 4/1990 | Yassaie et al. |
| 5,027,410 A | 6/1991 | Williamson et al. |
| 5,054,085 A | 10/1991 | Meisel et al. |
| 5,058,419 A | 10/1991 | Nordstrom et al. |
| 5,099,738 A | 3/1992 | Hotz |
| 5,119,711 A | 6/1992 | Bell et al. |
| 5,142,961 A | 9/1992 | Paroutaud |
| 5,150,413 A | 9/1992 | Nakatani et al. |
| 5,175,769 A | 12/1992 | Hejna, Jr. et al. |
| 5,187,776 A | 2/1993 | Yanker |
| 5,208,864 A | 5/1993 | Kaneda |
| 5,210,366 A | 5/1993 | Sykes, Jr. |
| 5,230,022 A | 7/1993 | Sakata |
| 5,319,736 A | 6/1994 | Hunt |
| 5,323,459 A | 6/1994 | Hirano |
| 5,341,432 A | 8/1994 | Suzuki et al. |
| 5,371,800 A * | 12/1994 | Komatsu et al. ............ 704/225 |
| 5,381,473 A | 1/1995 | Andrea et al. |
| 5,381,512 A | 1/1995 | Holton et al. |
| 5,400,409 A | 3/1995 | Linhard |
| 5,402,493 A | 3/1995 | Goldstein |
| 5,402,496 A | 3/1995 | Soli et al. |
| 5,406,635 A * | 4/1995 | Jarvinen ................. 381/94.3 |
| 5,471,195 A | 11/1995 | Rickman |
| 5,473,702 A * | 12/1995 | Yoshida et al. ............ 381/94.7 |
| 5,473,759 A | 12/1995 | Slaney et al. |
| 5,479,564 A | 12/1995 | Vogten et al. |
| 5,502,663 A | 3/1996 | Lyon |
| 5,544,250 A | 8/1996 | Urbanski |
| 5,574,824 A | 11/1996 | Slyh et al. |
| 5,583,784 A | 12/1996 | Kapust et al. |
| 5,587,998 A | 12/1996 | Velardo, Jr. et al. |
| 5,590,241 A | 12/1996 | Park et al. |
| 5,602,962 A | 2/1997 | Kellermann |
| 5,675,778 A | 10/1997 | Jones |
| 5,682,463 A | 10/1997 | Allen et al. |
| 5,694,474 A | 12/1997 | Ngo et al. |
| 5,706,395 A | 1/1998 | Arslan et al. |
| 5,717,829 A | 2/1998 | Takagi |
| 5,729,612 A | 3/1998 | Abel et al. |
| 5,732,189 A | 3/1998 | Johnston et al. |
| 5,749,064 A | 5/1998 | Pawate et al. |
| 5,757,937 A | 5/1998 | Itoh et al. |
| 5,792,971 A | 8/1998 | Timis et al. |
| 5,796,819 A | 8/1998 | Romesburg |
| 5,806,025 A | 9/1998 | Vis et al. |
| 5,809,463 A | 9/1998 | Gupta et al. |
| 5,825,320 A | 10/1998 | Miyamori et al. |
| 5,839,101 A | 11/1998 | Vahatalo et al. |
| 5,920,840 A | 7/1999 | Satyamurti et al. |
| 5,933,495 A | 8/1999 | Oh |
| 5,943,429 A | 8/1999 | Handel |
| 5,956,674 A | 9/1999 | Smyth et al. |
| 5,974,380 A | 10/1999 | Smyth et al. |
| 5,978,824 A | 11/1999 | Ikeda |
| 5,983,139 A | 11/1999 | Zierhofer |
| 5,990,405 A | 11/1999 | Auten et al. |
| 6,002,776 A | 12/1999 | Bhadkamkar et al. |
| 6,061,456 A | 5/2000 | Andrea et al. |
| 6,072,881 A | 6/2000 | Linder |
| 6,097,820 A | 8/2000 | Turner |
| 6,108,626 A | 8/2000 | Cellario et al. |
| 6,122,610 A | 9/2000 | Isabelle |
| 6,134,524 A | 10/2000 | Peters et al. |
| 6,137,349 A | 10/2000 | Menkhoff et al. |
| 6,140,809 A | 10/2000 | Doi |
| 6,173,255 B1 | 1/2001 | Wilson et al. |
| 6,180,273 B1 | 1/2001 | Okamoto |
| 6,181,753 B1 * | 1/2001 | Takada et al. ................. 375/346 |
| 6,216,103 B1 | 4/2001 | Wu et al. |
| 6,222,927 B1 | 4/2001 | Feng et al. |
| 6,223,090 B1 | 4/2001 | Brungart |
| 6,226,616 B1 | 5/2001 | You et al. |
| 6,263,307 B1 | 7/2001 | Arslan et al. |
| 6,266,633 B1 | 7/2001 | Higgins et al. |
| 6,317,501 B1 | 11/2001 | Matsuo |
| 6,339,758 B1 | 1/2002 | Kanazawa et al. |
| 6,355,869 B1 | 3/2002 | Mitton |
| 6,363,345 B1 | 3/2002 | Marash et al. |
| 6,381,570 B2 | 4/2002 | Li et al. |
| 6,430,295 B1 | 8/2002 | Handel et al. |
| 6,434,417 B1 | 8/2002 | Lovett |
| 6,449,586 B1 | 9/2002 | Hoshuyama |
| 6,469,732 B1 | 10/2002 | Chang et al. |
| 6,487,257 B1 | 11/2002 | Gustafsson et al. |
| 6,496,795 B1 | 12/2002 | Malvar |
| 6,513,004 B1 | 1/2003 | Rigazio et al. |
| 6,516,066 B2 | 2/2003 | Hayashi |
| 6,529,606 B1 | 3/2003 | Jackson, Jr. II et al. |
| 6,549,630 B1 | 4/2003 | Bobisuthi |
| 6,584,203 B2 | 6/2003 | Elko et al. |
| 6,622,030 B1 | 9/2003 | Romesburg et al. |
| 6,717,991 B1 | 4/2004 | Gustafsson et al. |
| 6,718,309 B1 | 4/2004 | Selly |
| 6,738,482 B1 | 5/2004 | Jaber |
| 6,760,450 B2 | 7/2004 | Matsuo |
| 6,785,381 B2 | 8/2004 | Gartner et al. |
| 6,792,118 B2 | 9/2004 | Watts |
| 6,795,558 B2 | 9/2004 | Matsuo |
| 6,798,886 B1 | 9/2004 | Smith et al. |
| 6,810,273 B1 | 10/2004 | Mattila et al. |
| 6,882,736 B2 | 4/2005 | Dickel et al. |
| 6,915,264 B2 | 7/2005 | Baumgarte |
| 6,917,688 B2 | 7/2005 | Yu et al. |
| 6,944,510 B1 | 9/2005 | Ballesty et al. |
| 6,978,159 B2 | 12/2005 | Feng et al. |
| 6,982,377 B2 | 1/2006 | Sakurai et al. |
| 6,999,582 B1 | 2/2006 | Popovic et al. |
| 7,016,507 B1 | 3/2006 | Brennan |
| 7,020,605 B2 | 3/2006 | Gao |
| 7,031,478 B2 | 4/2006 | Belt et al. |
| 7,054,452 B2 | 5/2006 | Ukita |
| 7,065,485 B1 | 6/2006 | Chong-White et al. |
| 7,076,315 B1 | 7/2006 | Watts |
| 7,092,529 B2 | 8/2006 | Yu et al. |
| 7,092,882 B2 | 8/2006 | Arrowood et al. |
| 7,099,821 B2 | 8/2006 | Visser et al. |
| 7,142,677 B2 | 11/2006 | Gonopolskiy et al. |
| 7,146,316 B2 | 12/2006 | Alves |
| 7,155,019 B2 | 12/2006 | Hou |
| 7,164,620 B2 | 1/2007 | Hoshuyama |
| 7,171,008 B2 | 1/2007 | Elko |
| 7,171,246 B2 | 1/2007 | Mattila et al. |
| 7,174,022 B1 | 2/2007 | Zhang et al. |
| 7,206,418 B2 | 4/2007 | Yang et al. |
| 7,209,567 B1 | 4/2007 | Kozel et al. |
| 7,225,001 B1 | 5/2007 | Eriksson et al. |
| 7,242,762 B2 | 7/2007 | He et al. |
| 7,246,058 B2 | 7/2007 | Burnett |
| 7,254,242 B2 | 8/2007 | Ise et al. |
| 7,359,520 B2 | 4/2008 | Brennan et al. |
| 7,412,379 B2 | 8/2008 | Taori et al. |
| 8,213,597 B2 * | 7/2012 | Hjelm .................. 379/406.1 |
| 2001/0016020 A1 | 8/2001 | Gustafsson et al. |
| 2001/0031053 A1 | 10/2001 | Feng et al. |
| 2001/0038699 A1 * | 11/2001 | Hou .................... 381/92 |
| 2002/0002455 A1 | 1/2002 | Accardi et al. |
| 2002/0009203 A1 | 1/2002 | Erten |
| 2002/0041693 A1 | 4/2002 | Matsuo |
| 2002/0080980 A1 | 6/2002 | Matsuo |
| 2002/0106092 A1 | 8/2002 | Matsuo |
| 2002/0116187 A1 | 8/2002 | Erten |
| 2002/0133334 A1 | 9/2002 | Coorman et al. |
| 2002/0147595 A1 | 10/2002 | Baumgarte |
| 2002/0150265 A1 * | 10/2002 | Matsuzawa et al. ........ 381/94.2 |
| 2002/0184013 A1 | 12/2002 | Walker |
| 2003/0014248 A1 | 1/2003 | Vetter |
| 2003/0026437 A1 | 2/2003 | Janse et al. |
| 2003/0033140 A1 | 2/2003 | Taori et al. |
| 2003/0039369 A1 | 2/2003 | Bullen |
| 2003/0040908 A1 | 2/2003 | Yang et al. |
| 2003/0061032 A1 | 3/2003 | Gonopolskiy |
| 2003/0063759 A1 | 4/2003 | Brennan et al. |
| 2003/0072382 A1 | 4/2003 | Raleigh et al. |

(56) References Cited

U.S. PATENT DOCUMENTS

| | | |
|---|---|---|
| 2003/0072460 A1 | 4/2003 | Gonopolskiy et al. |
| 2003/0095667 A1 | 5/2003 | Watts |
| 2003/0099345 A1 | 5/2003 | Gartner et al. |
| 2003/0101048 A1 | 5/2003 | Liu |
| 2003/0103632 A1 | 6/2003 | Goubran et al. |
| 2003/0128851 A1 | 7/2003 | Furuta |
| 2003/0138116 A1 | 7/2003 | Jones et al. |
| 2003/0147538 A1 | 8/2003 | Elko |
| 2003/0169891 A1 | 9/2003 | Ryan et al. |
| 2003/0228023 A1 | 12/2003 | Burnett et al. |
| 2004/0013276 A1 | 1/2004 | Ellis et al. |
| 2004/0047464 A1 | 3/2004 | Yu et al. |
| 2004/0057574 A1 | 3/2004 | Faller |
| 2004/0078199 A1 | 4/2004 | Kremer et al. |
| 2004/0131178 A1 | 7/2004 | Shahaf et al. |
| 2004/0133421 A1 | 7/2004 | Burnett et al. |
| 2004/0165736 A1 | 8/2004 | Hetherington et al. |
| 2004/0196989 A1 | 10/2004 | Friedman et al. |
| 2004/0263636 A1 | 12/2004 | Cutler et al. |
| 2005/0025263 A1 | 2/2005 | Wu |
| 2005/0027520 A1 | 2/2005 | Mattila et al. |
| 2005/0049864 A1 | 3/2005 | Kaltenmeier et al. |
| 2005/0060142 A1 | 3/2005 | Visser et al. |
| 2005/0152559 A1 | 7/2005 | Gierl et al. |
| 2005/0185813 A1 | 8/2005 | Sinclair et al. |
| 2005/0213778 A1 | 9/2005 | Buck et al. |
| 2005/0216259 A1 | 9/2005 | Watts |
| 2005/0228518 A1 | 10/2005 | Watts |
| 2005/0276423 A1 | 12/2005 | Aubauer et al. |
| 2005/0278171 A1* | 12/2005 | Suppappola et al. ......... 704/227 |
| 2005/0288923 A1 | 12/2005 | Kok |
| 2006/0072768 A1 | 4/2006 | Schwartz et al. |
| 2006/0074646 A1 | 4/2006 | Alves et al. |
| 2006/0098809 A1 | 5/2006 | Nongpiur et al. |
| 2006/0120537 A1 | 6/2006 | Burnett et al. |
| 2006/0133621 A1 | 6/2006 | Chen et al. |
| 2006/0149535 A1 | 7/2006 | Choi et al. |
| 2006/0184363 A1 | 8/2006 | McCree et al. |
| 2006/0198542 A1 | 9/2006 | Benjelloun Touimi et al. |
| 2006/0222184 A1 | 10/2006 | Buck et al. |
| 2007/0021958 A1 | 1/2007 | Visser et al. |
| 2007/0027685 A1 | 2/2007 | Arakawa et al. |
| 2007/0033020 A1 | 2/2007 | (Kelleher) Francois et al. |
| 2007/0067166 A1 | 3/2007 | Pan et al. |
| 2007/0078649 A1 | 4/2007 | Hetherington et al. |
| 2007/0094031 A1 | 4/2007 | Chen |
| 2007/0100612 A1 | 5/2007 | Ekstrand et al. |
| 2007/0116300 A1 | 5/2007 | Chen |
| 2007/0150268 A1 | 6/2007 | Acero et al. |
| 2007/0154031 A1 | 7/2007 | Avendano et al. |
| 2007/0165879 A1 | 7/2007 | Deng et al. |
| 2007/0195968 A1 | 8/2007 | Jaber |
| 2007/0230712 A1 | 10/2007 | Belt et al. |
| 2007/0276656 A1 | 11/2007 | Solbach et al. |
| 2008/0019548 A1 | 1/2008 | Avendano |
| 2008/0033723 A1 | 2/2008 | Jang et al. |
| 2008/0140391 A1 | 6/2008 | Yen et al. |
| 2008/0201138 A1 | 8/2008 | Visser et al. |
| 2008/0228478 A1 | 9/2008 | Hetherington et al. |
| 2008/0260175 A1 | 10/2008 | Elko |
| 2009/0012783 A1 | 1/2009 | Klein |
| 2009/0012786 A1 | 1/2009 | Zhang et al. |
| 2009/0129610 A1 | 5/2009 | Kim et al. |
| 2009/0220107 A1 | 9/2009 | Every et al. |
| 2009/0238373 A1 | 9/2009 | Klein |
| 2009/0253418 A1 | 10/2009 | Makinen |
| 2009/0271187 A1 | 10/2009 | Yen et al. |
| 2009/0323973 A1* | 12/2009 | Dyba ............................ 381/58 |
| 2009/0323982 A1 | 12/2009 | Solbach et al. |
| 2010/0094643 A1 | 4/2010 | Avendano et al. |
| 2010/0278352 A1 | 11/2010 | Petit et al. |
| 2011/0178800 A1 | 7/2011 | Watts |

FOREIGN PATENT DOCUMENTS

| | | |
|---|---|---|
| JP | 5053587 | 3/1993 |
| JP | 6269083 | 9/1994 |
| JP | 10-313497 | 11/1998 |
| JP | 11-249693 | 9/1999 |
| JP | 2005110127 | 4/2005 |
| JP | 2005195955 | 7/2005 |
| WO | 01/74118 | 10/2001 |
| WO | 03/043374 | 5/2003 |
| WO | 03/069499 | 8/2003 |
| WO | 2007/081916 | 7/2007 |
| WO | 2007/140003 | 12/2007 |
| WO | 2010/005493 | 1/2010 |

OTHER PUBLICATIONS

Allen, Jont B. et al. "A Unified Approach to Short-Time Fourier Analysis and Synthesis", Proceedings of the IEEE. vol. 65, No. 11, Nov. 1977. pp. 1558-1564.

Avendano, Carlos, "Frequency-Domain Source Identification and Manipulation in Stereo Mixes for Enhancement, Suppression and Re-Panning Applications," 2003 IEEE Workshop on Application of Signal Processing to Audio and Acoustics, Oct. 19-22, pp. 55-58, New Paltz, New York, USA.

Boll, Steven F. "Suppression of Acoustic Noise in Speech using Spectral Subtraction", IEEE Transactions on Acoustics, Speech and Signal Processing, vol. ASSP-27, No. 2, Apr. 1979, pp. 113-120.

Boll, Steven F. et al. "Suppression of Acoustic Noise in Speech Using Two Microphone Adaptive Noise Cancellation", IEEE Transactions on Acoustic, Speech, and Signal Processing, vol. ASSP-28, No. 6, Dec. 1980, pp. 752-753.

Boll, Steven F. "Suppression of Acoustic Noise in Speech Using Spectral Subtraction", Dept. of Computer Science, University of Utah Salt Lake City, Utah, Apr. 1979, pp. 18-19.

Chen, Jingdong et al. "New Insights into the Noise Reduction Wiener Filter", IEEE Transactions on Audio, Speech, and Language Processing. vol. 14, No. 4, Jul. 2006, pp. 1218-1234.

Cohen, Israel et al. "Microphone Array Post-Filtering for Non-Stationary Noise Suppression", IEEE International Conference on Acoustics, Speech, and Signal Processing, May 2002, pp. 1-4.

Cohen, Israel, "Multichannel Post-Filtering in Nonstationary Noise Environments", IEEE Transactions on Signal Processing, vol. 52, No. 5, May 2004, pp. 1149-1160.

Dahl, Mattias et al., "Simultaneous Echo Cancellation and Car Noise Suppression Employing a Microphone Array", 1997 IEEE International Conference on Acoustics, Speech, and Signal Processing, Apr. 21-24, pp. 239-242.

Elko, Gary W., "Chapter 2: Differential Microphone Arrays", "Audio Signal Processing for Next-Generation Multimedia Communication Systems", 2004, pp. 12-65, Kluwer Academic Publishers, Norwell, Massachusetts, USA.

"ENT 172." Instructional Module. Prince George's Community College Department of Engineering Technology. Accessed: Oct. 15, 2011. Subsection: "Polar and Rectangular Notation". <http://academic.ppgcc.edu/ent/ent172_instr_mod.html>.

Fuchs, Martin et al. "Noise Suppression for Automotive Applications Based on Directional Information", 2004 IEEE International Conference on Acoustics, Speech, and Signal Processing, May 17-21, pp. 237-240.

Fulghum, D. P. et al., "LPC Voice Digitizer with Background Noise Suppression", 1979 IEEE International Conference on Acoustics, Speech, and Signal Processing, pp. 220-223.

Goubran, R.A. "Acoustic Noise Suppression Using Regression Adaptive Filtering", 1990 IEEE 40th Vehicular Technology Conference, May 6-9, pp. 48-53.

Graupe, Daniel et al., "Blind Adaptive Filtering of Speech from Noise of Unknown Spectrum Using a Virtual Feedback Configuration", IEEE Transactions on Speech and Audio Processing, Mar. 2000, vol. 8, No. 2, pp. 146-158.

Haykin, Simon et al. "Appendix A.2 Complex Numbers." Signals and Systems. 2nd Ed. 2003. p. 764.

(56) References Cited

OTHER PUBLICATIONS

Hermansky, Hynek "Should Recognizers Have Ears?", In Proc. ESCA Tutorial and Research Workshop on Robust Speech Recognition for Unknown Communication Channels, pp. 1-10, France 1997.
Hohmann, V. "Frequency Analysis and Synthesis Using a Gammatone Filterbank", ACTA Acustica United with Acustica, 2002, vol. 88, pp. 433-442.
Jeffress, Lloyd A. et al. "A Place Theory of Sound Localization," Journal of Comparative and Physiological Psychology, 1948, vol. 41, p. 35-39.
Jeong, Hyuk et al., "Implementation of a New Algorithm Using the STFT with Variable Frequency Resolution for the Time-Frequency Auditory Model", J. Audio Eng. Soc., Apr. 1999, vol. 47, No. 4., pp. 240-251.
Kates, James M. "A Time-Domain Digital Cochlear Model", IEEE Transactions on Signal Processing, Dec. 1991, vol. 39, No. 12, pp. 2573-2592.
Lazzaro, John et al., "A Silicon Model of Auditory Localization," Neural Computation Spring 1989, vol. 1, pp. 47-57, Massachusetts Institute of Technology.
Lippmann, Richard P. "Speech Recognition by Machines and Humans", Speech Communication, Jul. 1997, vol. 22, No. 1, pp. 1-15.
Liu, Chen et al. "A Two-Microphone Dual Delay-Line Approach for Extraction of a Speech Sound in the Presence of Multiple Interferers", Journal of the Acoustical Society of America, vol. 110, No. 6, Dec. 2001, pp. 3218-3231.
Martin, Rainer et al. "Combined Acoustic Echo Cancellation, Dereverberation and Noise Reduction: A two Microphone Approach", Annales des Telecommunications/Annals of Telecommunications. vol. 49, No. 7-8, Jul.-Aug 1994, pp. 429-438.
Martin, Rainer "Spectral Subtraction Based on Minimum Statistics", in Proceedings Europe. Signal Processing Conf., 1994, pp. 1182-1185.
Mitra, Sanjit K. Digital Signal Processing: a Computer-based Approach. 2nd Ed. 2001. pp. 131-133.
Mizumachi, Mitsunori et al. "Noise Reduction by Paired-Microphones Using Spectral Subtraction", 1998 IEEE International Conference on Acoustics, Speech and Signal Processing, May 12-15. pp. 1001-1004.
Moonen, Marc et al. "Multi-Microphone Signal Enhancement Techniques for Noise Suppression and Dereverbration," http://www.esat.kuleuven.ac.be/sista/yearreport97//node37.html, accessed on Apr. 21, 1998.
Watts, Lloyd Narrative of Prior Disclosure of Audio Display on Feb. 15, 2000 and May 31, 2000.
Cosi, Piero et al. (1996), "Lyon's Auditory Model Inversion: a Tool for Sound Separation and Speech Enhancement," Proceedings of ESCA Workshop on 'The Auditory Basis of Speech Perception,' Keele University, Keele (UK), Jul. 15-19, 1996, pp. 194-197.
Parra, Lucas et al. "Convolutive Blind Separation of Non-Stationary Sources", IEEE Transactions on Speech and Audio Processing. vol. 8, No. 3, May 2008, pp. 320-327.
Rabiner, Lawrence R. et al. "Digital Processing of Speech Signals", (Prentice-Hall Series in Signal Processing). Upper Saddle River, NJ: Prentice Hall, 1978.
Weiss, Ron et al., "Estimating Single-Channel Source Separation Masks: Revelance Vector Machine Classifiers vs. Pitch-Based Masking", Workshop on Statistical and Perceptual Audio Processing, 2006.
Schimmel, Steven et al., "Coherent Envelope Detection for Modulation Filtering of Speech," 2005 IEEE International Conference on Acoustics, Speech, and Signal Processing, vol. 1, No. 7, pp. 221-224.
Slaney, Malcom, "Lyon's Cochlear Model", Advanced Technology Group, Apple Technical Report #13, Apple Computer, Inc., 1988, pp. 1-79.
Slaney, Malcom, et al. "Auditory Model Inversion for Sound Separation," 1994 IEEE International Conference on Acoustics, Speech and Signal Processing, Apr. 19-22, vol. 2, pp. 77-80.
Slaney, Malcom. "An Introduction to Auditory Model Inversion", Interval Technical Report IRC 1994-014, http://coweb.ecn.purdue.edu/~maclom/interval/1994-014/, Sep. 1994, accessed on Jul. 6, 2010.
Solbach, Ludger "An Architecture for Robust Partial Tracking and Onset Localization in Single Channel Audio Signal Mixes", Technical University Hamburg-Harburg, 1998.
Stahl, V. et al., "Quantile Based Noise Estimation for Spectral Subtraction and Wiener Filtering," 2000 IEEE International Conference on Acoustics, Speech, and Signal Processing, Jun. 5-9, vol. 3, pp. 1875-1878.
Syntrillium Software Corporation, "Cool Edit User's Manual", 1996, pp. 1-74.
Tashev, Ivan et al. "Microphone Array for Headset with Spatial Noise Suppressor", http://research.microsoft.com/users/ivantash/Documents/Tashev_MAforHeadset_HSCMA_05.pdf. (4 pages).
Tchorz, Jurgen et al., "SNR Estimation Based on Amplitude Modulation Analysis with Applications to Noise Suppression", IEEE Transactions on Speech and Audio Processing, vol. 11, No. 3, May 2003, pp. 184-192.
Valin, Jean-Marc et al. "Enhanced Robot Audition Based on Microphone Array Source Separation with Post-Filter", Proceedings of 2004 IEEE/RSJ International Conference on Intelligent Robots and Systems, Sep. 28-Oct. 2, 2004, Sendai, Japan. pp. 2123-2128.
Watts, Lloyd, "Robust Hearing Systems for Intelligent Machines," Applied Neurosystems Corporation, 2001, pp. 1-5.
Widrow, B. et al., "Adaptive Antenna Systems," Proceedings of the IEEE, vol. 55, No. 12, pp. 2143-2159, Dec. 1967.
Yoo, Heejong et al., "Continuous-Time Audio Noise Suppression and Real-Time Implementation", 2002 IEEE International Conference on Acoustics, Speech, and Signal Processing, May 13-17, pp. IV3980-IV3983.
International Search Report dated Jun. 8, 2001 in Application No. PCT/US01/08372.
International Search Report dated Apr. 3, 2003 in Application No. PCT/US02/36946.
International Search Report dated May 29, 2003 in Application No. PCT/US03/04124.
International Search Report and Written Opinion dated Oct. 19, 2007 in Application No. PCT/US07/00463.
International Search Report and Written Opinion dated Apr. 9, 2008 in Application No. PCT/US07/21654.
International Search Report and Written Opinion dated Sep. 16, 2008 in Application No. PCT/US07/12628.
International Search Report and Written Opinion dated Oct. 1, 2008 in Application No. PCT/US08/08249.
International Search Report and Written Opinion dated May 11, 2009 in Application No. PCT/US09/01667.
International Search Report and Written Opinion dated Aug. 27, 2009 in Application No. PCT/US09/03813.
International Search Report and Written Opinion dated May 20, 2010 in Application No. PCT/US09/06754.
Fast Cochlea Transform, US Trademark Reg. No. 2,875,755 (Aug. 17, 2004).
Dahl, Mattias et al., "Acoustic Echo and Noise Cancelling Using Microphone Arrays", International Symposium on Signal Processing and its Applications, ISSPA, Gold coast, Australia, Aug. 25-30, 1996, pp. 379-382.
Demol, M. et al. "Efficient Non-Uniform Time-Scaling of Speech With WSOLA for CALL Applications", Proceedings of InSTIL/ICALL2004—NLP and Speech Technologies in Advanced Language Learning Systems—Venice Jun. 17-19, 2004.
Laroche, Jean. "Time and Pitch Scale Modification of Audio Signals", in "Applications of Digital Signal Processing to Audio and Acoustics", The Kluwer International Series in Engineering and Computer Science, vol. 437, pp. 279-309, 2002.
Moulines, Eric et al., "Non-Parametric Techniques for Pitch-Scale and Time-Scale Modification of Speech", Speech Communication, vol. 16, pp. 175-205, 1995.
Verhelst, Werner, "Overlap-Add Methods for Time-Scaling of Speech", Speech Communication vol. 30, pp. 207-221, 2000.

\* cited by examiner

SYSTEM AND METHOD FOR ADAPTIVE POWER CONTROL

CROSS-REFERENCE TO RELATED APPLICATION

The present application claims the benefit of U.S. Provisional Patent Application No. 60/964,097, filed Aug. 8, 2007 and entitled "Adaptive Power Control," which is herein incorporated by reference. The present application is also related to U.S. patent application Ser. No. 11/825,563, filed Jul. 6, 2007 and entitled "System and Method for Adaptive Intelligent Noise Suppression," and U.S. patent application Ser. No. 11/441,675, filed May 25, 2006 and entitled "System and Method For Processing an Audio Signal," both of which are incorporated herein by reference.

BACKGROUND OF THE INVENTION

1. Field of Invention

The present invention relates generally to power control and more particularly to adaptive power control in an audio system.

2. Description of Related Art

Currently, there are many methods for enhancing speech in an audio signal and/or reducing background noise in an adverse audio environment. Typically, the associated speech enhancing algorithms require several millions of instructions per second (MIPS) in order to minimize noise sources from a captured audio signal. MIPS usage becomes significantly more critical for devices having a limited power source. For example, a mobile communication device (e.g., cellular phone, BLUETOOTH headset, etc.) may experience reduced talk time due to the excessive MIPS usage.

Conventionally, the speech enhancing algorithms are continuously operating, thus MIPS usage is occurring at a relatively constant rate. However, severe noise conditions are not continuous. Typically, a user is rarely exposed to severe noise conditions for more than 60% of usage time. Therefore, utilization of a continuous speech enhancement/noise suppression system in a mobile communication device drastically and unnecessarily reduces user talk time. As such, in order to maximize power savings, it would be desirable to be able to monitor characteristics of an auditory scene, and limit speech enhancement processing to when noise is likely present.

SUMMARY OF THE INVENTION

Embodiments of the present invention overcome or substantially alleviate prior problems associated with power consumption in power-limited devices. In exemplary embodiments, an energy or power level (e.g., noise level or any other measurable quantity of part of a signal) is determined for an incoming signal. Based on a comparison of the power level to one or more thresholds, a large power consuming system may be switched on or off. In one embodiment, the large power consuming system comprises a noise suppression system.

In exemplary embodiments, a primary signal is received. The primary signal may comprise a primary acoustic signal, which may contain a mixture of speech and background noise. In order to estimate a noise power level, a minimum power level of the primary signal is tracked. In exemplary embodiments, the noise power level may be estimated using a minimum statistics tracker. The resulting minimum power level may be smoothed by a leaky integrator, for example.

The estimated noise power level may then be compared to at least one power threshold. The one or more power thresholds comprise a preset value above which the large power consuming system remains on and below which the large power consuming system remains off. In some embodiments, a single power threshold may be established. In other embodiments, two power thresholds may be established: an activation threshold and a deactivation threshold.

Subsequently, the large power consuming system is controlled based on the comparison of the estimated noise power level to the power threshold. In exemplary embodiments, a control signal may be generated which is forwarded to a bypass engine comprising a switch and a signal continuity module. The switch then controls the usage of the large power consuming system. The signal continuity module is configured to guarantee continuity of the output signal when the switch turns on or off the large power consuming system.

DESCRIPTION OF EXEMPLARY EMBODIMENTS

The present invention provides exemplary systems and methods for adaptive power control in a device having a limited power source. Such devices may comprise mobile devices such as cellular phones, phone handsets, headsets, and other mobile communication devices. In exemplary embodiments, an energy level or power level (or any other measurable quantity of part of a signal) is determined for an incoming signal. In accordance with one embodiment, the power level is a noise level. According to some embodiments, however, the energy level or power level may be determined for a component of the incoming signal. Such a component may be, for example, a noise component. Based on a comparison of the (noise) energy level to one or more power thresholds, a larger power consuming system may be switched on or off. In one embodiment, the larger power consuming system comprises a noise suppression system. While embodiments of the present invention will be described with reference to operation on a cellular phone, the present invention may be practiced on or between any device (s).

Figure 1:
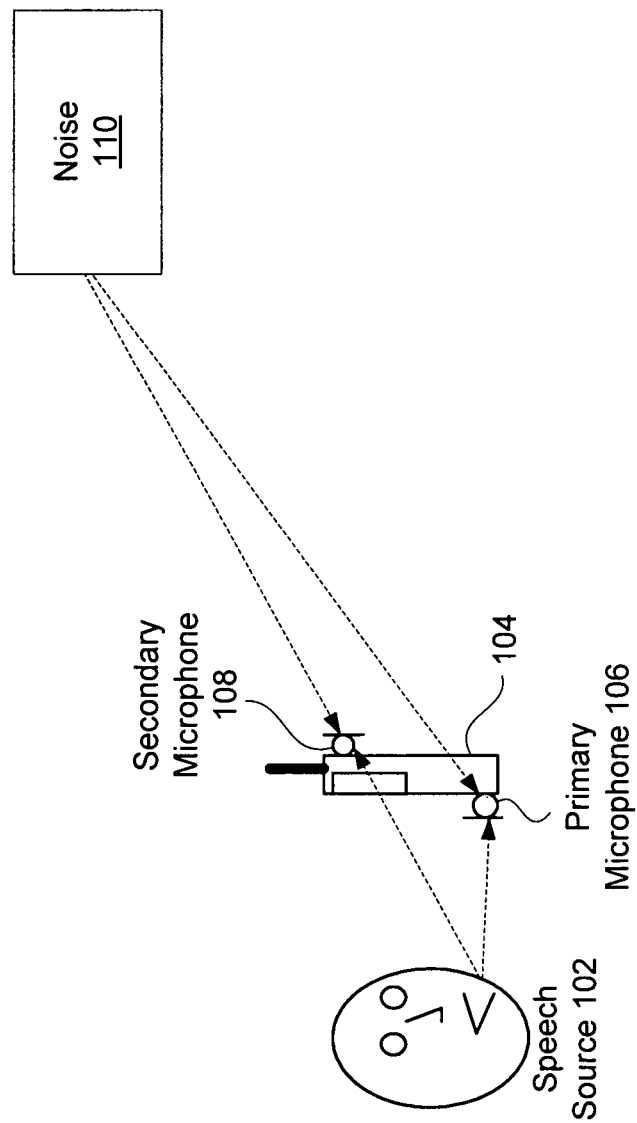
FIG. 1 is a diagram of an environment in which embodiments of the present invention may be practiced.

Referring to FIG. 1, an environment in which embodiments of the present invention may be practiced is shown. A user acts as a speech source 102 to an audio device 104. The exemplary audio device 104 comprises two microphones: a primary microphone 106 relative to the speech source 102 and a secondary microphone 108 located a distance away from the primary microphone 106. In some embodiments, the microphones 106 and 108 comprise omni-directional microphones. It should be noted that embodiments of the present invention may operate using only a single microphone.

While the microphones 106 and 108 receive sound (i.e., acoustic signals) from the speech source 102, the microphones 106 and 108 also pick up noise 110. Although the noise 110 is shown coming from a single location in FIG. 1, the noise 110 may comprise any sounds from one or more locations different than the audio source 102, and may include reverberations and echoes. The noise 110 may be stationary, non-stationary, and/or a combination of both stationary and non-stationary noise.

Some embodiments of the present invention utilize level differences (e.g., energy differences) between the acoustic signals received by the two microphones 106 and 108. Because the primary microphone 106 is much closer to the speech source 102 than the secondary microphone 108, the intensity level is higher for the primary microphone 106 resulting in a larger energy level during a speech/voice segment, for example.

The level difference may then be used to discriminate speech and noise in a time-frequency domain in accordance with some embodiments. Other embodiments may use a combination of energy level differences and time delays to discriminate speech. Based on binaural cue decoding, speech signal extraction, speech enhancement, and/or noise suppression may be performed. Unfortunately, continuous speech enhancement and noise suppression performed in a frequency domain may be responsible for a large percentage of an overall MIPS budget. MIPS are directly proportional to power consumption. As such, in order to maximize power savings, the speech enhancement and noise suppression processing may be deactivated when not needed.

Figure 2:
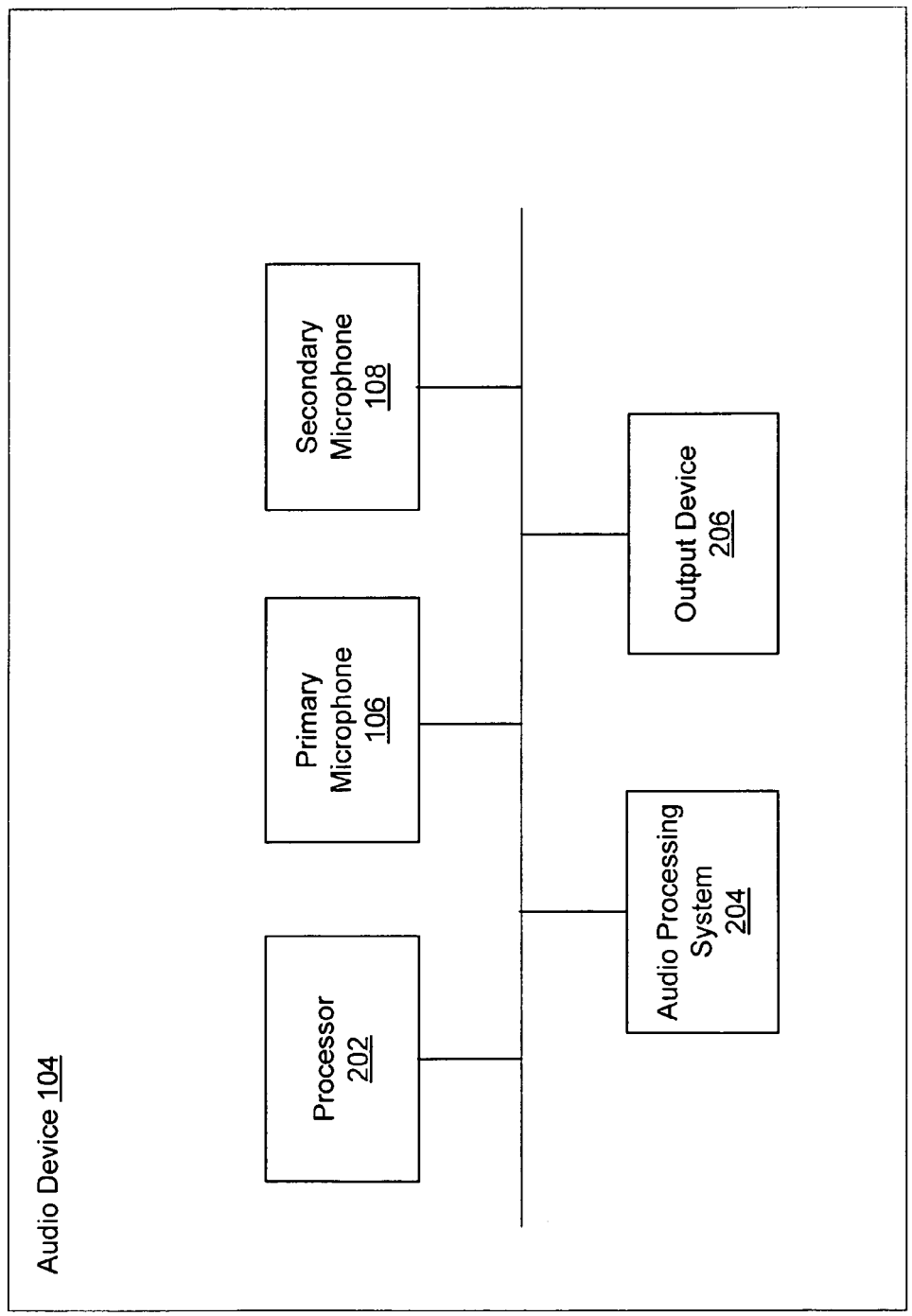
FIG. 2 is a block diagram of an exemplary audio device implementing embodiments of the present invention.

Referring now to FIG. 2, the exemplary audio device 104 is shown in more detail. In exemplary embodiments, the audio device 104 is an audio receiving device that comprises a processor 202, the primary microphone 106, the secondary microphone 108, an audio processing system 204, and an output device 206. The audio device 104 may comprise further components necessary for audio device 104 operations. The audio processing system 204 will be discussed in more details in connection with FIG. 3.

As previously discussed, the primary and secondary microphones 106 and 108, respectively, are spaced a distance apart in order to allow for an energy level differences between them. Upon reception by the microphones 106 and 108, the acoustic signals may be converted into electric signals (i.e., a primary electric signal and a secondary electric signal). The electric signals may themselves be converted by an analog-to-digital converter (not shown) into digital signals for processing in accordance with some embodiments. In order to differentiate the acoustic signals, the acoustic signal received by the primary microphone 106 is herein referred to as the primary acoustic signal, while the acoustic signal received by the secondary microphone 108 is herein referred to as the secondary acoustic signal. It should be noted that embodiments of the present invention may be practiced utilizing only a single microphone (i.e., the primary microphone 106). In other embodiments, the microphones 106 and 108 may be replaced by other types of sensors. These sensors may capture acoustic signals, visual signals (e.g., light, motion), or any other type of signals.

The output device 206 is any device which provides an audio output to the user. For example, the output device 206 may comprise an earpiece of a headset or handset, or a speaker on a conferencing device.

Figure 3:
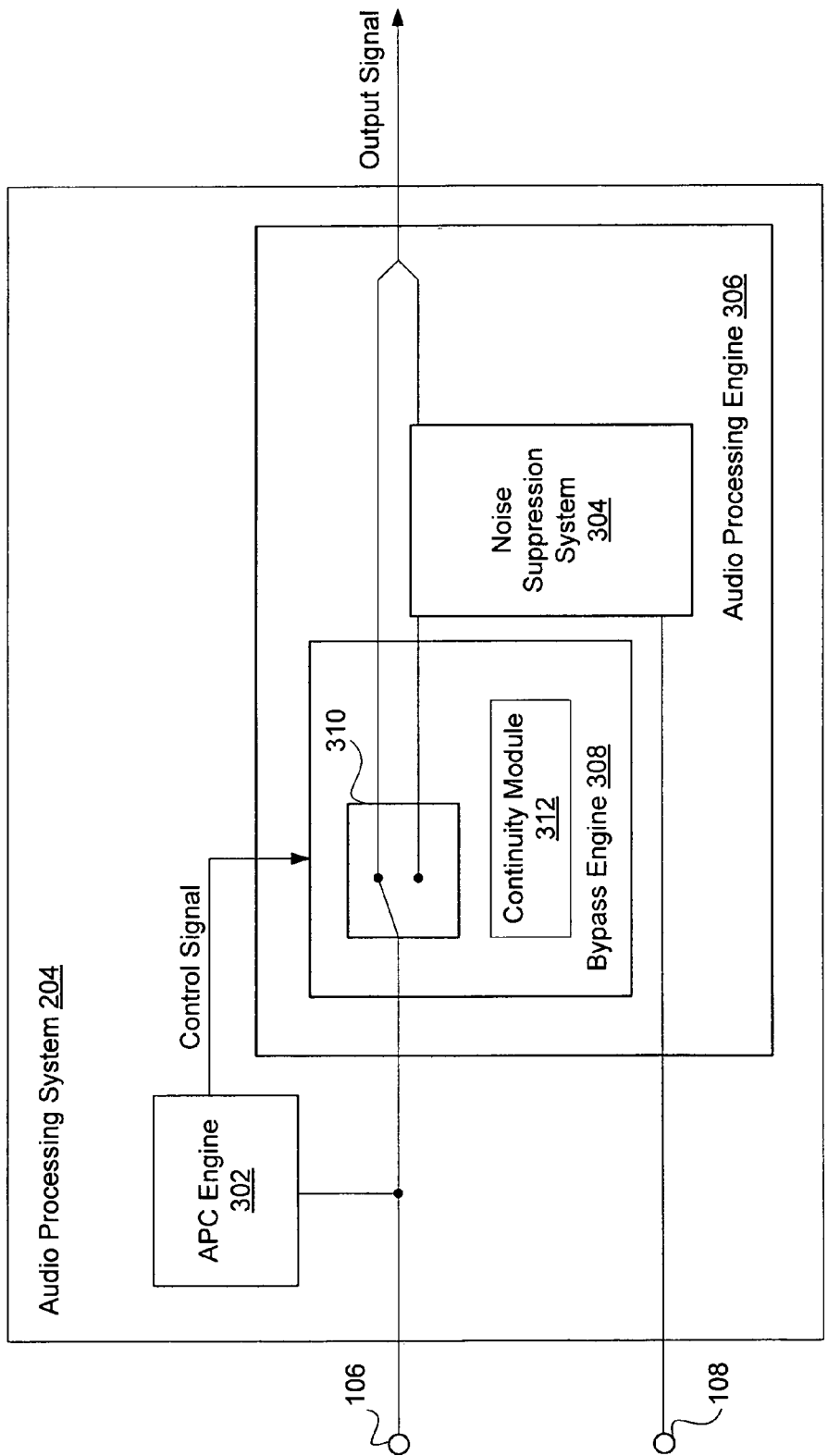
FIG. 3 is a block diagram of an exemplary audio processing system.

FIG. 3 is a detailed block diagram of the exemplary audio processing system 204, according to one embodiment of the present invention. In exemplary embodiments, the audio processing system 204 is embodied within a memory device. In operation, the acoustic signals received from the primary and secondary microphones 106 and 108 are converted to electric signals.

The acoustic signal from the primary microphone 106 (i.e., primary acoustic signal) is routed to an adaptive power control (APC) engine 302 for analysis. The APC engine 302 is configured to analyze the primary acoustic signal to determine whether a noise suppression system 304 in an audio processing engine 306 should perform noise suppression on the primary acoustic signal. The APC engine 302 will be discussed in more detail in connection with FIG. 4.

Based on the analysis, a control signal may be generated by the APC engine 302 and forwarded to a bypass engine 308 comprising a switch 310 to control the performance of the noise suppression system 304. It is noted, however, that in some embodiments the control signal may be forwarded directly to the noise suppression system 304 to turn it on and off. In embodiments where noise suppression should not be performed, the switch 310 will remain in an off position. In the off position, the primary acoustic signal may be directly outputted as an output signal. In some embodiments when the noise suppression system introduces time frequency modifications to the primary signal, the output signal may be process by a signal continuity module 312 that is designed to avoid discontinuities in the output signals. In the exemplary embodiment the signal continuity module 312 may preserve the latency introduced by the noise suppression system. In exemplary embodiments, the output signal may then be sent to a communication device of a second user.

In embodiments where noise suppression should be performed, the switch 310 will remain in an on position. In the on position, the primary acoustic signal is processed through the noise suppression system 304. In some embodiments, an acoustic signal from the secondary microphone 108 (i.e., secondary acoustic signal) is provided to the noise suppression system 304. An example of the noise suppression system 304 will be discussed in more detail in connection with FIG. 5.

In exemplary embodiments, time constraints for turning switching on and off may be implemented. It is important for the noise suppression system 304 to be switched off as fast as possible without encountering any false positives. However, the adaptive power control engine 302 wants to ensure that the power level is significantly below the threshold before the noise suppression system 304 is switched off. As such, a reaction time or latency may be introduced. In one example, the latency may be 10 seconds for switching the noise suppression system 304 off. The latency may be less for turning the noise suppression system 304 on (e.g., 5 seconds).

Figure 4:
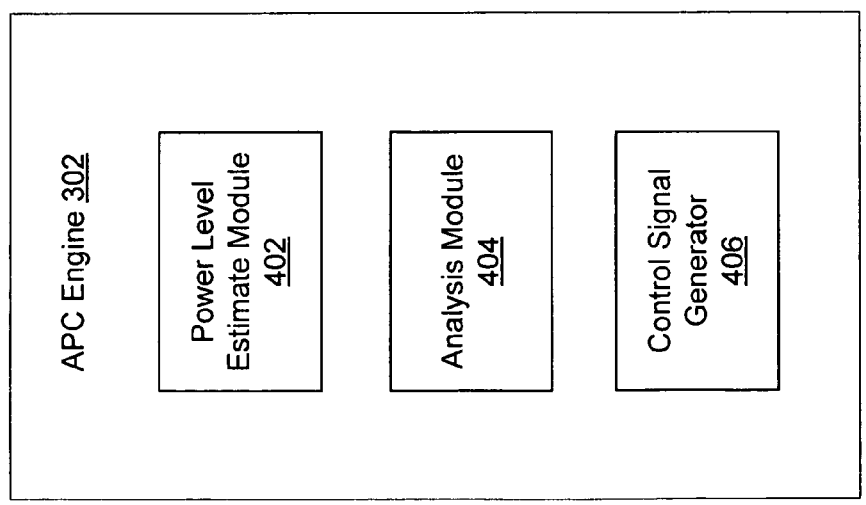
FIG. 4 is a block diagram of an exemplary adaptive power control engine.

Referring now to FIG. 4, the APC engine 302 is shown in more detail. In exemplary embodiments, the APC engine 302 is configured to monitor the primary acoustic signal in order to determine whether noise conditions are severe enough to require noise suppression. The exemplary APC engine 302 may comprise a power level estimate module 402, analysis module 404, and control signal generator 406.

In exemplary embodiments, the power level estimate module 402 is configured to estimate a minimum energy or power level of the primary acoustic signal. The minimum power level may be measured, in one embodiment, as:

$$P_1 = \frac{1}{N} \sum_{i=0}^{N-1} X_1^2(i)$$

where N is a sample size of an algorithm frame (e.g., 5 or 10 ms) and $X_1$ is the digitized primary acoustic signal.

In accordance with one embodiment, the power level estimate module 402 comprises a minimum statistics tracker which tracks the minimum power level of the primary acoustic signal. In some embodiments, a minimum may be withheld for an m number of frames until a new minimum is found.

The exemplary minimum statistics tracker may track a minimum energy of the broadband primary acoustic signal in a time domain for each frame. In exemplary embodiments, energy is tracked between speech pauses to provide a primary microphone power (e.g., noise) estimate. The minimum statistics tracking may be based upon an assumption that a noise level changes at a much slower rate than a speech level. The noise may be obtained by using the signal path energy, effectively during speech pauses, to extrapolate across regions where speech is present.

It should be noted that alternative embodiments may utilize other known methods for determining the noise power estimate. For example, A. Sugiyama proposed a method involving weighted noise estimation in Chapter 6 of "Speech Enhancement" by J. Benesty, S. Makino, J. Chen. Other methods may be based on voice activity detection and recursive averaging, soft-decision methods, bias compensated tracking of spectral minima, and various combinations thereof. One specific example that may apply the aforementioned methods is a mixed excitation linear prediction (MELP) coder. The MELP coder may be based on a log spectral amplitude estimator, multiplicative soft-decision gain modification, adaptive gain limiting, estimation of an a priori SNR, minimum statistics noise power estimation, and combinations thereof.

Since the minimum statistics tracker may not exploit spatial information that is available to multiple microphone systems and since it relies on stationarity cues, the minimum statistics tracker may underestimates the energy or power level for non-stationary distractors since it tracks a minimum energy. As such, the primary microphone power estimate effectively provides only a floor for a final noise power estimate.

In exemplary embodiments, minimum tracking is performed within a logarithmic domain. As a result, an initial fine smoothing of the signal path frame energies may be performed to attenuate any large negative peaks. In some embodiments, the estimated minimum power level is smoothed by a leaky integrator as follows:

$$P_{1S} = \mu \cdot P_1(m) + (1-\mu) \cdot P_1(m-1)$$

where $\mu$ is a time constant <1 that controls an effective length of the integrator and $P_{1S}$ is a smoothed version of the minimum power level of the primary acoustic signal.

The tracked minimum power level may then be compared with one or more preset power thresholds by the analysis module 404. In some embodiments, a single power threshold is established. When the minimum power level is below the single power threshold, then the switch 310 is positioned off and noise suppression is not performed. However, when the minimum power level is above the single power threshold, then the switch 310 is positioned on and noise suppression is performed. It should be noted that if the switch is already in a proper position (i.e., either off or on) based on a previous minimum power level, then the noise suppression system 304 will remain in the off or on mode.

In order to avoid fluctuation between the off and on states, a threshold mechanism with hysteresis may be implemented. In these embodiments, two different power thresholds may be established: an activation power threshold and a deactivation power threshold. For example, the activation power threshold may be set at a higher value then the deactivation power threshold.

Based on the comparison result of the analysis module 404, a control signal may be generated by the control signal generator 406. The control signal is then provided to the switch 310 and to the noise suppression system 304. In some embodiments, if the comparison result indicates that noise suppression system 304 should remain in its current state, no control signal is generated as the switch is already in the proper position.

Figure 5:
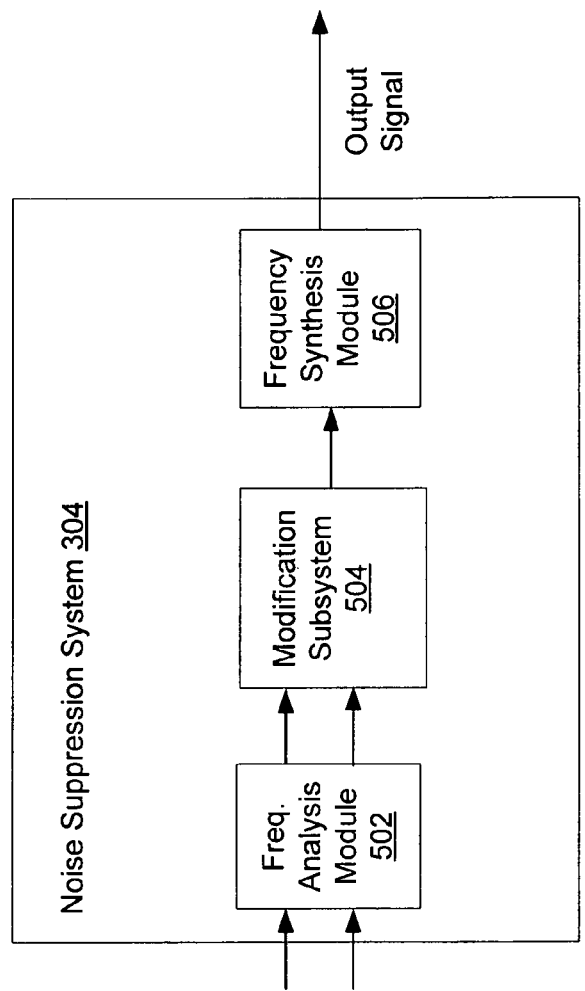
FIG. 5 is a diagram illustrating one example of a noise suppression engine.

FIG. 5 illustrates an example of the noise suppression system 304. In exemplary embodiments, the noise suppression system 304 may comprise a frequency analysis module 502, a modification subsystem 504, and a frequency synthesis module 506 (or reconstruction module).

In one embodiment, the frequency analysis module 502 takes the acoustic signals and mimics the frequency analysis of the cochlea (i.e., cochlear domain) simulated by a filter bank. In one example, the frequency analysis module 502 separates the acoustic signals into frequency sub-bands. A sub-band is the result of a filtering operation on an input signal where the bandwidth of the filter is narrower than the bandwidth of the signal received by the frequency analysis module 502. Alternatively, other filters such as short-time Fourier transform (STFT), sub-band filter banks, modulated complex lapped transforms, cochlear models, wavelets, etc., can be used for the frequency analysis and synthesis. Because most sounds (e.g., acoustic signals) are complex and comprise more than one frequency, a sub-band analysis on the acoustic signal determines what individual frequencies are present in the complex acoustic signal during a frame (e.g., a predetermined period of time). According to one embodiment, the frame is 5 ms long. Alternative embodiments may utilize other frame lengths or no frame at all. The results may comprise sub-band signals in a fast cochlea transform (FCT) domain.

It should be noted that the frequency analysis module 502 may comprise a power transform that is responsible for a large percentage of an overall MIPS budget. MIPS are, roughly speaking, directly proportional to power consumption. As such, in order to maximize power savings enabled by the APC engine 302, the monitoring by the APC engine 302 is performed in a domain different than the cochlea domain (e.g., in a time domain). Furthermore, the analysis performed by the APC engine 302 involves a broadband signal as opposed to sub-band signals. In some embodiments, however, the noise estimation may be performed in sub-bands, for example, since the complexity of the APC engine 302 may be much less than that of the noise suppression system 304.

The modification subsystem 504 may be configured to generate and apply a noise mask to the primary acoustic signal. In some embodiments, the modification subsystem 504 may comprise at least a noise estimate module, a mask generating module, and a mask application module. An example of the noise suppression system 304 and the modification subsystem 504 may be found in U.S. patent application Ser. No. 11/825,563 entitled "System and Method for Adaptive Intelligent Noise Suppression." A second example of the noise suppression system 304 may be found in U.S. patent application Ser. No. 11/441,675 entitled "System and Method for Processing an Audio Signal," both of which are incorporated by reference.

Finally, the masked frequency sub-bands are converted back into the time domain from the cochlea domain. The conversion may comprise taking the masked frequency sub-bands and adding together phase shifted signals of the cochlea channels in a frequency synthesis module 506. Alternatively, the conversion may comprise taking the masked frequency sub-bands and multiplying these with an inverse frequency of the cochlea channels in the frequency synthesis module 506. Once conversion is completed, the synthesized acoustic signal may be output to a user.

Figure 6:
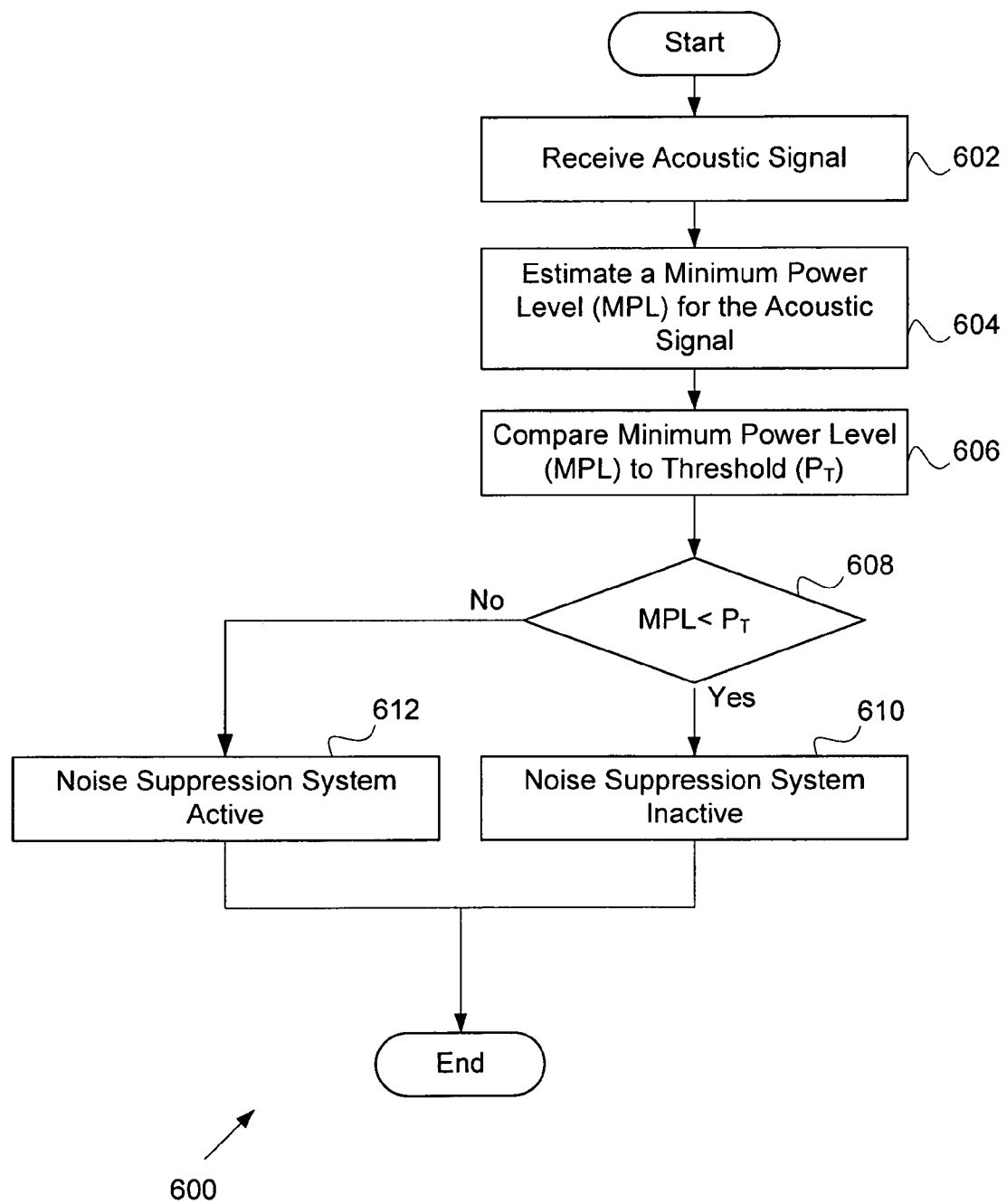
FIG. 6 is a flowchart of an exemplary method for adaptively controlling power in an audio processing system.

Referring now to FIG. 6, an exemplary flowchart 600 of an exemplary method for adaptive power control is shown. In step 602, audio signals are received by a primary microphone 106 and an optional secondary microphone 108. In exemplary embodiments, the acoustic signals are converted to digital format for processing.

In step 604, the power level is estimated, for example, by using a minimum power level tracking technique. In exemplary embodiments, a power level estimate module 402 is used to estate the minimum power level. In one embodiment, the power level estimate module 402 comprises a minimum statistics tracker configured to track a minimum power of the broadband primary acoustic signal in a time domain.

The minimum power level may then be compared with one or more power thresholds in step 606. The one or more power thresholds comprise a preset value above which results in the noise suppression system 304 remains on and below which the noise suppression system 304 remains off. In some embodiments, a single power threshold may be established. In other embodiments, two power thresholds may be established: an activation threshold and a deactivation threshold.

A determination is made in step 608 as to whether the minimum power level is above or below the power threshold. If the minimum power level is below the power threshold(s), then the noise suppression system is inactive in step 610. In embodiments where the signal modification process is currently active, a control signal may be generated by the adaptive power control engine 302 which is sent to the switch 310 and to the noise suppression system 304 to turn it off. If the noise suppression system is currently inactive, then no action may be needed.

If the minimum power level is above the power threshold(s) in step 608, then the then the noise suppression system is active in step 612. In embodiments where the signal modification process is currently inactive, a control signal may be generated by the adaptive power control engine 302 which is sent to the switch 310 and to the noise suppression system 304 to turn it on. If the noise suppression system is currently active, then no action may be needed.

The present invention has been described with reference to adaptive power control in a mobile communication device which results in the activation or deactivation of the noise suppression system 304. However, those skilled in the art will recognize that embodiments of the present invention may be applied to other devices and for activating/deactivating other systems. In exemplary embodiments, a power level of any signal may be determined. Based on a comparison of the power level to one or more thresholds, a larger power consumption system may be switched on or off. The larger power consumption system may comprise any type of operating system. For example, a presence of echo in a telephone line may be monitored, whereby an echo canceller is disabled if an estimated echo return loss exceeds a threshold. Another example may include turning off a TV based on detecting motion or body heat in a room.

The above-described modules can be comprises of instructions that are stored on storage media. The instructions can be retrieved and executed by the processor 202. Some examples of instructions include software, program code, and firmware. Some examples of storage media comprise memory devices and integrated circuits. The instructions are operational when executed by the processor 202 to direct the processor 202 to operate in accordance with embodiments of the present invention. Those skilled in the art are familiar with instructions, processor(s), and storage media.

The present invention is described above with reference to exemplary embodiments. It will be apparent to those skilled in the art that various modifications may be made and other embodiments can be used without departing from the broader scope of the present invention. For example, embodiments of the present invention may be utilized to control processing functions of any type of system based on detected minimum power levels. Therefore, these and other variations upon the exemplary embodiments are intended to be covered by the present invention.

The invention claimed is:

1. A method for providing adaptive power control, comprising:
receiving a primary acoustic signal having a plurality of components including a noise component, the primary acoustic signal representing at least one captured sound;
performing frequency analysis on the primary acoustic signal to generate a plurality of frequency sub-bands;
estimating a power level of the noise component of the primary acoustic signal, the estimating of the power level occurring in at least one frequency sub-band of the primary acoustic signal, the estimating of the power level comprising tracking the energy of the at least one frequency sub-band of the primary acoustic signal;
comparing the power level to at least one noise threshold; and
controlling a noise suppression system based on the comparison of the power level to the at least one noise threshold, wherein the noise suppression system is configured to be powered on and off based on the comparison;
wherein controlling the noise suppression system comprises providing continuity in an output signal when the noise suppression system is powered on or off by preserving a non-zero latency introduced by the noise suppression system.

2. The method of claim 1 further comprising receiving a secondary signal, the secondary signal being used by the noise suppression system for noise suppression processing.

3. The method of claim 1 wherein the estimating of the power level further comprises utilizing a minimum statistics tracker to track a minimum energy of the primary acoustic signal.

4. The method of claim 1 wherein the estimating of the power level further comprises smoothing a noise power level.

5. The method of claim 1 wherein the at least one noise threshold comprises an activation power threshold and a deactivation power threshold.

6. The method of claim 5 further comprising setting the activation power threshold at a higher value than the deactivation power threshold.

7. The method of claim 1 wherein the controlling of the noise suppression system further comprises generating a control signal to power on the noise suppression system or power off the noise suppression system.

8. The method of claim 1 wherein the power level comprises a noise level.

9. A system for providing adaptive power control, comprising:
a sensor configured to receive a primary acoustic signal having a plurality of components including a noise component, the primary acoustic signal representing at least one captured sound;

a frequency analysis module configured to perform frequency analysis on the primary acoustic signal to generate a plurality of frequency sub-bands;

a power level estimate module configured to estimate a power level of the noise component of the primary acoustic signal, the estimating of the power level occurring in at least one frequency sub-band of the primary acoustic signal, the power level estimate module tracking the energy of the at least one frequency sub-band of the primary acoustic signal;

an analysis module configured to compare the power level to at least one power threshold; and a bypass engine configured to control a noise suppression system based on a result from the analysis module, wherein the noise suppression system is configured to be powered on and off based on the comparison;

wherein controlling the noise suppression system comprises providing continuity in an output signal when the noise suppression system is powered on or off by preserving a non-zero latency introduced by the noise suppression system.

10. The system of claim 9 further comprising a control signal generator configured to generate a control signal provided to the bypass engine.

11. The system of claim 9 wherein the power level estimate module comprises a leaky integrator.

12. The system of claim 9 further comprising a secondary sensor configured to receive a secondary signal, the secondary signal being used by the noise suppression system for noise suppression processing.

13. The system of claim 9 wherein the bypass engine comprises a switch configured to power on the noise suppression system or power off the noise suppression system.

14. The system of claim 9 wherein the power level comprises a noise level.

15. A non-transitory machine readable medium having embodied thereon a program, the program providing instructions for a method for providing adaptive power control, the method comprising:

receiving a primary acoustic signal having a plurality of components including a noise component, the primary acoustic signal representing at least one captured sound;

performing frequency analysis on the primary acoustic signal to generate a plurality of frequency sub-bands;

estimating a power level of the noise component of the primary acoustic signal, the estimating of the power level occurring in at least one frequency sub-band of the primary acoustic signal, the estimating of the power level comprising tracking the energy of the at least one frequency sub-band of the primary acoustic signal;

comparing the power level to at least one power threshold; and controlling a noise suppression system based on the comparison of the power level to the at least one power threshold, wherein the noise suppression system is configured to be powered on and off based on the comparison;

wherein controlling the noise suppression system comprises providing continuity in an output signal when the noise suppression system is powered on or off by preserving a non-zero latency introduced by the noise suppression system.

* * * * *